UNITED STATES PATENT OFFICE.

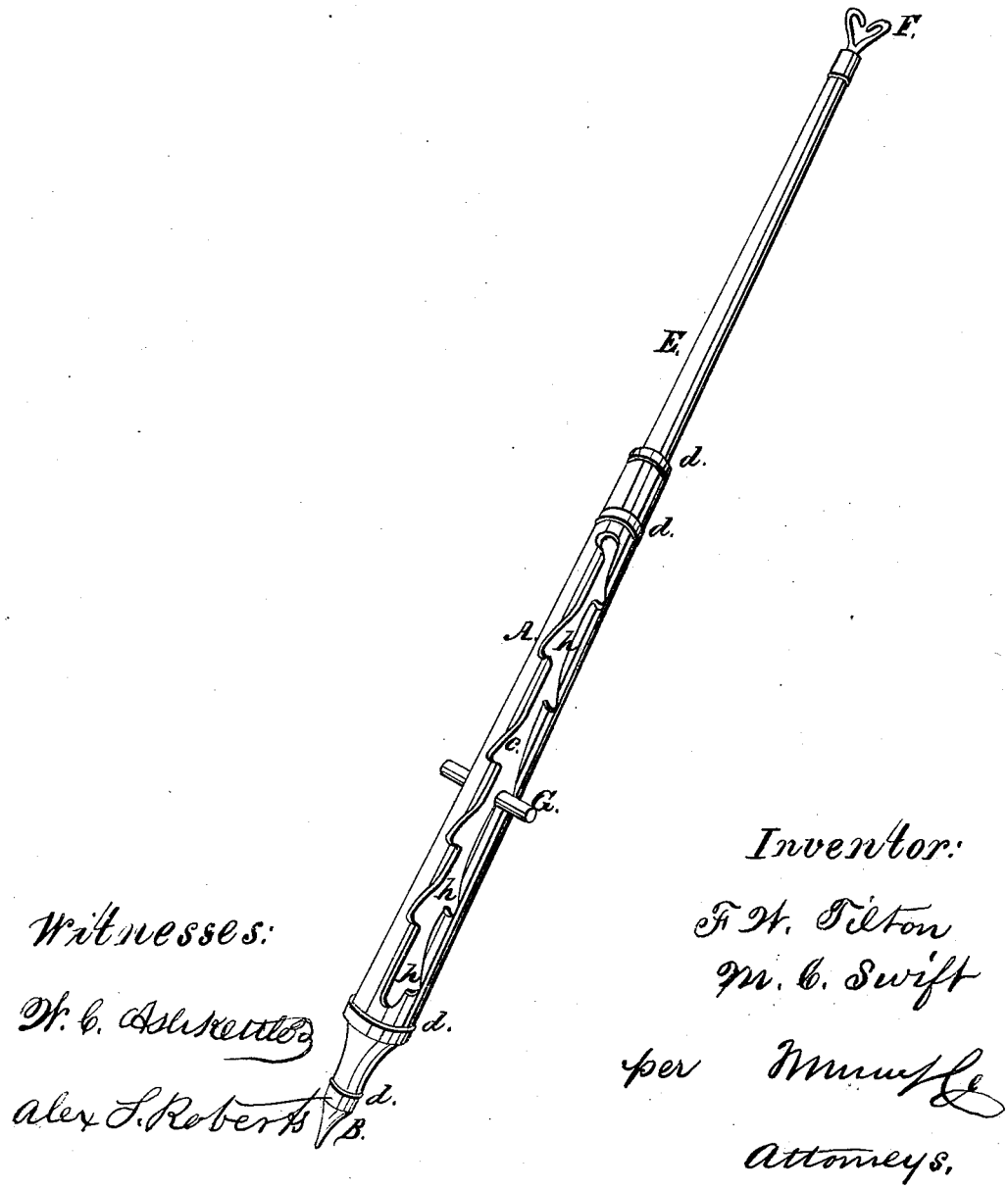

FRANCIS W. TILTON AND MOSES C. SWIFT, OF NEW BEDFORD, MASS.

IMPROVED CLOTHES-LINE SUPPORTER.

Specification forming part of Letters Patent No. 81,310, dated August 18, 1868; antedated August 12, 1868.

*To all whom it may concern:*

Be it known that we, FRANCIS W. TILTON and MOSES C. SWIFT, of New Bedford, in the county of Bristol and State of Massachusetts, have invented a new and Improved Extension Clothes-Line Supporter; and we do hereby declare that the following is a full, clear, and exact description thereof, which will enable those skilled in the art to make and use the same, reference being had to the accompanying drawings, forming part of this specification.

The object of this invention is to provide means for supporting clothes-lines and elevating the same; and the invention consists in arranging an adjustable pole within a tubular slotted stand, in the manner hereinafter described.

The drawing represents the arrangement, it being a longitudinal view of the same, showing the construction and operation.

A is the slotted tubular stand, which is supported at its bottom end by a joint or spur, (marked B.) C represents the slot in the stand, which slot passes directly through the stand. This slot is provided with hook-shaped notches $h$, as seen in the drawing, and so formed that a transverse rod may be supported thereon. The hooked notches $h$ are arranged upon each side of the stand and upon each of the edges of the slot, and extend nearly the length of the stand, as seen in the drawing. The stand is prevented from splitting by bands $d$, as seen in the drawing. E is the pole, placed within the tubular stand, to the upper end of which is attached a hooked support for the line, (marked F.) Transversely through the lower end of the pole E there is a rod, G, by which the pole is supported on the notches $h$, and by which it may be elevated on the notches, as seen in the drawing.

The advantages of this arrangement will be apparent to all. The foot of the supporter is kept securely in place by the spur B, whether on the ground or on a wooden floor, while the line is safely secured at the top of the pole by the hook F. By this supporter the line, with the clothes thereon, may be elevated so as to be entirely out of the way in yards or in crossing walks.

Having thus described our invention, we claim as new and desire to secure by Letters Patent—

1. The tubular slotted stand A, with the hooked notches $h$ therein, substantially as and for the purposes described.

2. In combination with the stand A, the pole E, with the rod G and the hook F, arranged substantially as and for the purposes set forth.

FRANCIS W. TILTON.
MOSES C. SWIFT.

Witnesses:
LEML. T. WILLCOX,
GEO. H. FIELD.